Patented Oct. 10, 1950

2,524,957

UNITED STATES PATENT OFFICE 2,524,957

ISOCINCHOMERONIC ACID BY OXIDATION OF 2,5-DIALKYLPYRIDINE WITH CONCENTRATED NITRIC ACID

Lawton Arthur Burrows, Mendenhall, Pa., and Henry Henderson Herring, Jr., Woodbury, N. J., assignors to E. I. du Pont de Nemours & Company, Wilmington, Del., a corporation of Delaware No Drawing. Application May 15, 1947, Serial No. 748,340

6 Claims. (Cl. 260—295)

This invention relates to a novel and improved process for the manufacture of isocinchomeronic acid, otherwise known as pyridine-2-5-dicarboxylic acid.

Isocinchomeronic acid is an organic chemical intermediate of considerable potential importance in the preparation of substances of dietary value. While this acid has been prepared on a laboratory scale in the past, the methods used have been expensive and not adapted to large scale production.

An object of the present invention is an improved method for the production of isocinchomeronic acid characterized by simplicity and efficiency in operations and results. A further object is such a method utilizing starting materials that are economically attractive and give favorable yields. Additional objects will be disclosed as the method is described in greater detail in the following.

We have found that the foregoing objects are attained when we bring about the reaction of nitric acid and a 2,5-dialkylpyridine, at an elevated temperature, with the resulting formation of isocinchomeronic acid, and separate this latter compound from the residual acid liquid. The reaction is effected under pressures greater than atmospheric, for example, at gage pressures between 30 and 700 pounds per square inch. We find it desirable to employ nitric acid of an initial strength between 40% and 95% $HNO_3$, and preferably between 40% and 65% $HNO_3$, and a suitable reaction temperature range is between 75° and 200° C., preferably between 160° and 190° C.

The invention will be understood more clearly by reference to the following examples, which will show specific embodiments of procedures followed. It will be understood that these examples are by way of illustration only and are not to be taken as limiting in any way. In the statement of relative amounts of materials used, parts by weight are designated in all cases.

Example 1

Five parts of 5-ethyl-2-methylpyridine and 50 parts of 60% nitric acid were mixed gradually but quickly, the mixture representing a net acid-5-ethyl-2-methylpyridine ratio of six to one. External cooling with ice was applied during mixing to prevent premature vigorous reaction, and a homogeneous, light amber-colored solution resulted. The mixture was then charged into a pressure-resistant vessel, and the temperature was raised by application to said vessel of steam at 150 lbs. pressure. The oxidation reaction then took place in the course of a very few minutes, with increase of temperature and pressure within the reactor, reaction conditions being maintained for 30 minutes. Maximum temperatures and pressures were recorded of 196° C. and 550 lbs. per sq. in. (gage). No venting of gaseous products took place during the run.

At the end of the cycle and after cooling of the reactor, the gaseous products were vented, the products removed as a clear, dark red liquid, and the reactor was washed out.

After dilution of the acid solution and standing for an hour, crude isocinchomeronic acid was filtered off and washed free from nitric acid by means of cold water. The melting point of the dried crude product was between 233 and 239° C., with decomposition and sublimation.

Some isocinchomeronic acid remained in the residual acid solution after dilution, and this was recovered almost quantitatively by precipitation of the copper salt, from which the free acid was readily recovered by agitating in water, making the solution strongly alkaline with caustic soda, and boiling. The soluble sodium salt was filtered off from the copper oxide precipitate and the solution acidified with sulfuric acid, whereupon fine white crystals of isocinchomeronic acid were obtained.

The total yield of this acid amounted to 72.7% of the theoretical based on the 5-ethyl-2-methylpyridine, of which 48.2% was obtained by precipitation and 24.5% from the copper salt.

Example 2

A similar reaction was carried out using 20 parts of 5-ethyl-2-methylpyridine and 200 parts of 60% nitric acid. In this run, a modified reactor was used and the time of contact was 26 minutes, maximum temperatures and pressures of 178° C. and 610 lbs. per sq. in. respectively being recorded.

A total yield of isocinchomeronic acid of 63.3% was obtained, 45.2% by precipitation on dilution and 18.1% from the copper salt.

Example 3

In another experiment employing five parts of the same dialkylpyridine and 62.5 parts of 40% nitric acid, a net acid ratio of five to one, maximum temperature and pressure of 193° C. and 485 lbs. per sq. in. respectively were recorded. A total yield of 60.8% resulted.

Example 4

A further run was carried out, using 20 parts of the dialkylpyridine and 240 parts of 50% nitric acid, a net acid ratio of six to one, with maximum temperature and pressure of 196° C. and 550 lbs. per sq. in. respectively. A total yield of isocinchomeronic acid was obtained of 60.5% of theoretical.

Example 5

In a further experiment, five parts of the dialkylpyridine and 35.7 parts of 70% nitric acid were reacted, a net acid ratio of five to one, with maximum temperature and pressure of 199° C. and 530 lbs. per sq. in. respectively. The total yield of product amounted to 72.5%.

The reaction taking place in the process according to the invention proceeds as follows, and the yields given are based on the equation shown, one molecule of isocinchomeronic acid being formed from each molecule of dialkylpyridine.

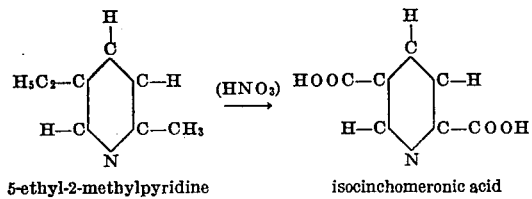

5-ethyl-2-methylpyridine     isocinchomeronic acid

It will be understood that the oxidation reaction results also in the formation of considerable volumes of carbon dioxide, water, and nitrogen oxides. Isocinchomeronic acid is a white microcrystalline powder having a melting point, when pure, of around 238° C.

The invention utilizes as starting material a 2,5-dialkylpyridine, preferably one in which relatively few carbon atoms are present in the substituent groups, for example, 5-ethyl-2-methylpyridine, 2,5-dimethylpyridine, and the like. Preferably we employ the first of the above compounds because of its presence in generally available materials and as a synthetically-prepared compound.

Nitric acid is the oxidizing agent in accordance with the invention and a considerable excess of this reagent is desirably used, for example, in a ratio of 100% acid to the pyridine derivative of between three and fifteen to one, our preferred ratio being around six to one. While various strengths of nitric acid are suitable, we find acid of between 40% and 95% $HNO_3$ the proper concentration for use, 60% strength being very satisfactory. As an alternative to nitric acid as oxidant, we may also employ nitrogen tetroxide, desirably in conjunction with suitable solvents.

An essential feature of the process is the maintenance of superatmospheric pressure. Because of the formation of gaseous reaction products during the process, pressure conditions may be attained by operating in a pressure-resistant vessel and not venting gaseous products. Desirably, however, a constant pressure will be approximated by controlled or periodic venting, and a desirable operating pressure is between 30 and 700 pounds per square inch (gage). An elevated temperature is an essential and will be attained by reason of the exothermic nature of the reaction and by controlled heating of the reactor. A suitable temperature range is between 75° and 200° C., and preferably between 160° and 195°.

The process may be carried out without the use of a catalyst, if desired, but we may wish to employ an oxidation catalyst in small amount, for example, ammonium vanadate, vanadium pentoxide, etc. We may find it desirable also to assist the process and help conserve nitric acid by passing air or other oxygen-containing gas through the reaction mixture.

The procedure for the manufacture of isocinchomeronic acid according to the invention may be carried out as a batch or continuous process. In either case, the spent acid will desirably be cycled back to the process after fortifying to the desired strength. Operating in accordance with the examples cited, the liquid product resulting from the oxidation reaction is diluted with water, for example, with four to five times its volume, in order to precipitate the greater part of the isocinchomeronic acid. While the remainder of this product still in solution was recovered according to the examples by separation as the copper salt, this latter procedure will be unnecessary in actual operations, where the residual acid will be cycled back to the process for recovery of isocinchomeronic acid in the succeeding run.

The process described shows a simplified and efficient procedure for obtaining in good yields isocinchomeronic acid, which is a potentially important chemical intermediate for the preparation of products of high value. While the method has been described adequately, it will be understood that various modification in details of procedure, operating conditions, and forms and concentrations of reactants may be introduced without departure from the scope of the invention.

We intend to be limited, therefore, only by the following claims:

1. A process for the manufacture of isocinchomeronic acid, which comprises reacting a 2,5-dialkylpyridine with nitric acid of a concentration between 40% and 95% $HNO_3$, carrying out the reaction at an elevated temperature and under pressure greater than atmospheric, and separating isocinchomeronic acid from the acid mixture.

2. The process of claim 1, in which a net acid-dialkylpyridine ratio is used of between three and fifteen to one.

3. The process of claim 1, in which the process is carried out at a pressure of between 30 and 700 pounds per square inch.

4. The process of claim 1, in which the reaction is carried out at a temperature between 75° and 200° C.

5. The process of claim 1, in which the reaction is effected in the presence of an oxidation catalyst.

6. A process for the manufacture of isocinchomeronic acid which comprises reacting 5-ethyl-2-methylpyridine with nitric acid of a strength between 40% and 70% $HNO_3$, carrying out the reaction at a temperature between 160° and 195° C. and at a gage pressure between 30 and 700 pounds per square inch, and separating isocinchomeronic acid from the residual acid liquid.

LAWTON ARTHUR BURROWS.
    HENRY HENDERSON HERRING, Jr.

REFERENCES CITED

The following references are of record in the file of this patent:

Handbook of Chemistry and Physics, 26th edition, pages 432-433, 902-903 (1942-1943).

P. B. 639, I. G. Farben Publication, pages 1-3, published in U. S., Jan. 1946.